(12) United States Patent
Coyle, Jr.

(10) Patent No.: US 9,371,948 B2
(45) Date of Patent: Jun. 21, 2016

(54) LIQUID-TIGHT CONNECTOR

(71) Applicant: HEYCO, INC., Toms River, NJ (US)

(72) Inventor: William J. Coyle, Jr., Toms River, NJ (US)

(73) Assignee: HEYCO, INC., Toms River, NJ (US)

( * ) Notice: Subject to any disclaimer, the term of this patent is extended or adjusted under 35 U.S.C. 154(b) by 0 days.

(21) Appl. No.: 14/459,495

(22) Filed: Aug. 14, 2014

(65) Prior Publication Data

US 2015/0048614 A1    Feb. 19, 2015

Related U.S. Application Data

(60) Provisional application No. 61/865,832, filed on Aug. 14, 2013.

(51) Int. Cl.
| | | |
|---|---|---|
| F16L 21/06 | (2006.01) | |
| F16L 19/14 | (2006.01) | |
| F16L 19/12 | (2006.01) | |
| F16L 5/06 | (2006.01) | |
| H02G 3/06 | (2006.01) | |

(52) U.S. Cl.
CPC . *F16L 19/14* (2013.01); *F16L 5/06* (2013.01); *F16L 19/12* (2013.01); *H02G 3/0675* (2013.01)

(58) Field of Classification Search
USPC .......................................................... 174/653
See application file for complete search history.

(56) References Cited

U.S. PATENT DOCUMENTS

| | | | |
|---|---|---|---|
| 682,847 | A | 9/1901 | Forsyth |
| 1,904,617 | A * | 4/1933 | Buchanan .................. 285/149.1 |
| 2,310,622 | A | 2/1943 | Ellinwood |
| 2,475,322 | A | 7/1949 | Horton |
| 2,528,533 | A | 11/1950 | McCulloch |
| 2,664,458 | A | 12/1953 | Rapata |
| 2,967,722 | A | 1/1961 | Lifka |
| 2,974,186 | A | 3/1961 | Klumpp, Jr. |
| 3,144,695 | A | 8/1964 | Budwig |

(Continued)

FOREIGN PATENT DOCUMENTS

| | | |
|---|---|---|
| AT | 309932 | 9/1973 |
| DE | 9011069 | 10/1990 |

(Continued)

OTHER PUBLICATIONS

International Search Report and Written Opinion mailed Oct. 2, 2014 in regard to PCT Application No. PCT/US14/51004.

(Continued)

*Primary Examiner* — Aaron Dunwoody
(74) *Attorney, Agent, or Firm* — Greenberg Traurig, LLP

(57) ABSTRACT

A liquid-tight connector includes a threaded body, a finger/gland assembly within an annular pocket within the body, and a compression nut that engages a first threaded portion of the body. The finger/gland assembly includes a plurality of fingers attached to a sealing gland in an annular, collet-type fashion. The sealing gland and the fingers may be integral with one another. The sealing gland and the fingers may be co-molded with one another. Tightening the compression nut on the threaded body causes the compression nut to engage the fingers of the finger/gland assembly and bias the fingers toward each other. Such biasing causes the fingers to move inward and compress the sealing gland so that it forms a liquid-tight seal around the entire circumference of a cable within the body of the connector.

20 Claims, 11 Drawing Sheets

(56) References Cited

U.S. PATENT DOCUMENTS

| | | | |
|---|---|---|---|
| 3,262,721 A | 7/1966 | Knight | |
| 3,290,430 A | 12/1966 | Klumpp, Jr. | |
| 3,376,004 A | 4/1968 | Goldman | |
| 3,464,659 A | 9/1969 | Klumpp, Jr. | |
| 3,719,971 A | 3/1973 | Lodi | |
| 3,809,798 A | 5/1974 | Simon | |
| 3,953,665 A | 4/1976 | Nicholson | |
| 3,958,300 A | 5/1976 | Tanaka | |
| 3,972,547 A | 8/1976 | Itoya | |
| 4,000,875 A | 1/1977 | Jemison | |
| 4,034,944 A | 7/1977 | Moran | |
| 4,145,075 A * | 3/1979 | Holzmann | 285/81 |
| 4,194,768 A | 3/1980 | Gretz | |
| 4,224,464 A | 9/1980 | Bunnell | |
| 4,225,162 A | 9/1980 | Dola | |
| 4,250,348 A * | 2/1981 | Kitagawa | 174/655 |
| 4,264,047 A | 4/1981 | Nelson | |
| 4,302,035 A | 11/1981 | Ochwat | |
| 4,323,727 A | 4/1982 | Berg | |
| 4,400,022 A | 8/1983 | Wright | |
| 4,432,520 A | 2/1984 | Simon | |
| 4,457,544 A | 7/1984 | Snow | |
| 4,478,381 A | 10/1984 | Pittion | |
| 4,487,386 A | 12/1984 | Hehl | |
| 4,490,576 A | 12/1984 | Bolante | |
| 4,494,779 A | 1/1985 | Neff | |
| 4,544,800 A * | 10/1985 | Katsuura | 174/653 |
| 4,568,047 A | 2/1986 | Matsui | |
| 4,646,995 A | 3/1987 | Matsui | |
| 4,692,562 A | 9/1987 | Nattel | |
| 4,698,459 A | 10/1987 | Drake | |
| 4,708,370 A | 11/1987 | Todd | |
| 4,729,534 A | 3/1988 | Hill | |
| 4,739,126 A | 4/1988 | Gutter | |
| 4,775,121 A | 10/1988 | Carty | |
| 4,835,342 A | 5/1989 | Guginsky | |
| 4,874,325 A | 10/1989 | Bensing | |
| 4,888,453 A | 12/1989 | Blasko | |
| 4,903,995 A | 2/1990 | Blenkush | |
| 4,913,385 A | 4/1990 | Law | |
| 5,072,072 A | 12/1991 | Bawa | |
| 5,098,310 A | 3/1992 | Avramovich | |
| 5,113,717 A | 5/1992 | Plamper | |
| 5,132,493 A | 7/1992 | Sheehan | |
| 5,200,575 A | 4/1993 | Sheehan | |
| 5,226,837 A | 7/1993 | Cinibulk | |
| 5,304,742 A | 4/1994 | Filbert | |
| 5,318,459 A | 6/1994 | Shields | |
| 5,321,205 A | 6/1994 | Bawa | |
| 5,346,264 A | 9/1994 | Law | |
| 5,388,866 A | 2/1995 | Schlosser | |
| 5,390,876 A | 2/1995 | Hatano | |
| 5,405,172 A | 4/1995 | Mullen, Jr. | |
| 5,494,245 A | 2/1996 | Suzuki | |
| 5,543,582 A | 8/1996 | Stark | |
| 5,563,378 A | 10/1996 | Uchida | |
| 5,653,411 A | 8/1997 | Picco | |
| 5,820,048 A | 10/1998 | Shereyk | |
| 5,866,853 A * | 2/1999 | Sheehan | 174/653 |
| 5,872,335 A | 2/1999 | Mullen, Jr. | |
| 5,906,342 A | 5/1999 | Kraus | |
| 5,984,373 A | 11/1999 | Fitoussi | |
| 6,044,868 A | 4/2000 | Gretz | |
| 6,102,442 A | 8/2000 | Gretz | |
| 6,102,445 A | 8/2000 | Thomas | |
| 6,142,429 A | 11/2000 | Ahroni | |
| 6,164,604 A | 12/2000 | Cirino | |
| 6,231,085 B1 | 5/2001 | Olson | |
| 6,300,569 B1 | 10/2001 | Mullen, Jr. | |
| 6,311,935 B1 | 11/2001 | Mullen, Jr. | |
| 6,403,884 B1 * | 6/2002 | Lange | 174/653 |
| 6,488,317 B1 * | 12/2002 | Daoud | 285/322 |
| 6,585,297 B2 | 7/2003 | Mullen, Jr. | |
| 7,431,602 B2 * | 10/2008 | Corona | 439/272 |
| 7,563,993 B2 * | 7/2009 | Drotleff et al. | 174/655 |
| 2006/0219437 A1 | 10/2006 | Chiu | |
| 2008/0236861 A1 | 10/2008 | Bartholoma | |
| 2015/0200530 A1 * | 7/2015 | Chiu | 174/655 |

FOREIGN PATENT DOCUMENTS

| | | |
|---|---|---|
| DE | 19544963 | 6/1997 |
| EP | 0151273 | 8/1988 |
| EP | 0151272 | 7/1989 |
| EP | 0283575 | 8/1992 |
| FR | 2528533 | 12/1983 |
| GB | 2219146 | 11/1989 |
| GB | 2258350 | 2/1993 |
| GB | 2400503 | 10/2004 |
| WO | 94/27079 | 11/1994 |
| WO | 9836481 | 8/1998 |
| WO | 0105011 | 9/2001 |
| WO | 02025157 | 7/2002 |

OTHER PUBLICATIONS

English translation of DE 901106901.

* cited by examiner

US 9,371,948 B2

LIQUID-TIGHT CONNECTOR

CROSS-REFERENCE TO RELATED APPLICATION

The present application claims the benefit of U.S. Provisional Patent Application No. 61/865,832, having a filing date of Aug. 14, 2013, which is incorporated by reference herein in its entirety.

FIELD OF THE INVENTION

The present invention relates to a connector and, more particularly, to a liquid-tight connector for cables, wires, tubing, rods and other elongated objects.

BACKGROUND OF THE INVENTION

Liquid-tight connectors may be affixed in a liquid-tight manner in apertures of workpieces, such that cables, wires, tubing or rods may pass axially through such connectors and be locked in a liquid-tight engagement therein. Such connectors may also provide strain relief protection for the cables, wires, tubing or rods when such elements are engaged within the connectors.

SUMMARY OF THE INVENTION

In an embodiment of the present invention, a liquid-tight connector includes a threaded body, a finger/gland assembly positioned within the interior of the body and engaged therewith, and a compression nut arranged such that the compression nut threadedly engages and ratchets on the body. The body, finger/gland assembly, and compression nut are arranged such that tightening the compression nut on the threaded body causes the compression nut to engage the fingers of the finger/gland assembly and bias them toward each other. Such biasing causes the fingers to collapse inward, compressing the sealing gland such that it engagingly forms a liquid-tight seal around the entire circumference of a cable, or other elongated workpiece, within the body of the connector. In an embodiment, the finger/gland assembly include a plurality of fingers attached to a sealing gland in an annular, collet-type fashion. In an embodiment, the sealing gland and the plurality of fingers are integral with one another. In an embodiment, the sealing gland and the plurality of fingers are co-molded with one another.

BRIEF DESCRIPTION OF THE DRAWINGS

For a more complete understanding of the present invention, reference is made to the following detailed description of an exemplary embodiment considered in conjunction with the accompanying drawings, in which.

DETAILED DESCRIPTION OF THE INVENTION

Figure 1:
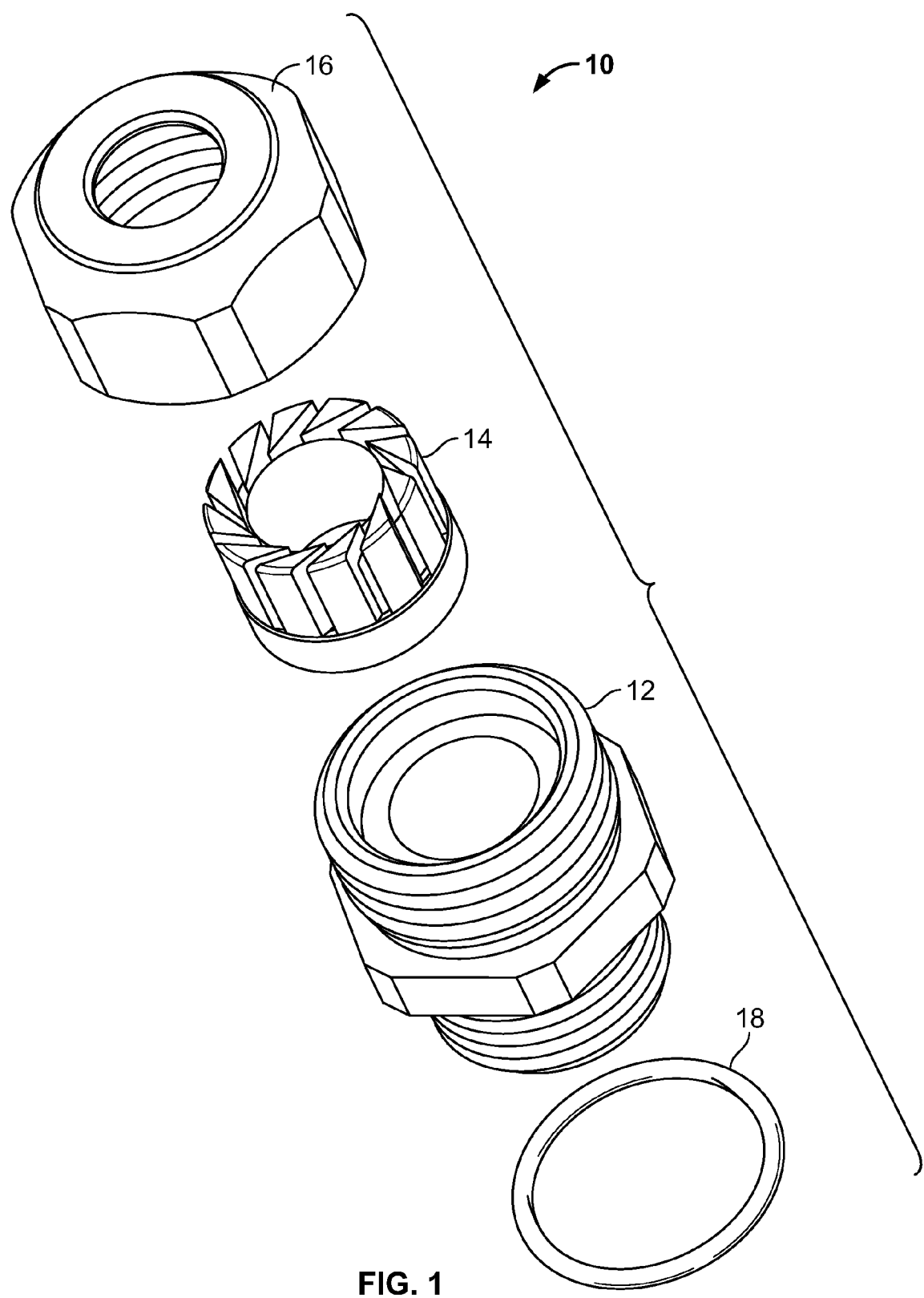
FIG. 1 is a schematic exploded perspective view of a liquid-tight connector in accordance with an embodiment of the invention.

Referring to FIG. 1, according to an embodiment of the present invention, a liquid-tight connector 10 includes a generally cylindrical body 12, a finger/gland assembly 14, a compression nut 16, and a sealing element 18. In the present embodiment of the invention, the sealing element 18 is an O-ring 18. In an embodiment, the body 12 and the compression nut 16 are made from metal, such as stainless steel, while the finger/gland assembly 14 is a collet-type component made from a thermoplastic polymer, thermoset polymer, and/or thermoplastic elastomer. In an embodiment, the body 12 and compression nut 16 are made from a thermoplastic or thermoset material, which may be filled or non-filled.

Referring to FIGS. 2-6, the body 12 includes a first end 20, a second end 22 opposite the first end 20, a first threaded portion 24 having a plurality of external threads 26, and a second threaded portion 28 opposite the first threaded portion 24 and having a plurality of external threads 30. An annular pocket 32 is formed within the first threaded portion 24 at the first end 20. As will be discussed below, the pocket 32 is adapted to receive the finger/gland assembly 14. A centrally located passage 34 extends from the first end 20 to the second end 22 of the body 12. In an embodiment, the passage 34 is sized and shaped to receive a cable, wire, tube, or other suitable elongated member. The first and second threaded portions 24, 28 are separated from one another by an outwardly-extending external shoulder 36. The shoulder 36 includes a first side 38 and a second side 40 opposite the first side 38. In an embodiment, the second side 40 of the shoulder 36 includes a circumferentially extending groove 42 that is adapted to receive the O-ring 18. In another embodiment, the second side 40 does not include the groove 42. In an embodiment, the shoulder 36 is hexagonal in shape and adapted to receive an installation tool, such as a wrench. In other embodiments, the shoulder 36 consists of other suitable shapes and sizes.

Referring to FIGS. 2 and 7-10, the finger/gland assembly 14 includes a sealing gland 46 and a plurality of fingers 48 attached to the sealing gland 46 in an annular, collet-type fashion, which will be described in greater detail below. In an embodiment, the plurality of fingers 48 are inserted into the gland 46. In an embodiment, the plurality of fingers 48 are securely held by the gland 46. In an embodiment, the sealing gland 46 and the plurality of fingers 48 are integral with one another. In an embodiment, the sealing gland 46 and the plurality of fingers 48 are co-molded with one another. In an embodiment, the fingers 48 include a thermoplastic material. In an embodiment, the sealing gland 46 includes an elastomer or a thermoplastic elastomer. The sealing gland 46 includes a first end 50, a second end 52 opposite the first end 50, a bevel 54 formed at the first end 50, and a base portion 56 formed at the second end 52. An opening 55 extends from the first end 50 to the second end 52. The sealing gland 46 includes an outer circumferential wall 58 and an annular flange 60 (also referred to herein as a collar 60) that surrounds the outer circumferential wall 58 and extends from the base portion 56 toward the first end 50 of the gland 46. Each of the fingers 48 is an elongated element including a first end 62 having a triangular-shape surface 64, a second end 66 opposite the first end 62 and having a lower notched portion 68 that is adapted to engage the collar 60 and the base portion 56, and an inner wall 70 facing the sealing gland 46. Each of the fingers 48 includes an upper notched portion 72 formed proximate to the first end 62 thereof and within the inner wall 70. As indicated above, the finger/gland assembly 14 may be co-molded, such that that the second ends 66 of the fingers 48 engage the outer circumferential wall 58, the collar 60, and the base 56 of the finger/gland assembly 14 such that the second ends 66 of the fingers 48 are restrained thereby, and the outer circumferential wall 58 of the sealing gland 46 is juxtaposed with and engages the inner walls 70 of the fingers 48. The first ends 62 of the fingers 48 extend over the first end 50 of the sealing gland 46, such that the upper notched portions 72 of the fingers 48 engage the bevel 54 and cradle the gland 46.

Referring to FIGS. 2 and 11-14, the compression nut 16 includes a first end 74, a second end 76 opposite the first end 74, a nut body 78 and a dome 80 extending from the nut body 78 to the second end 76. The compression nut 18 includes an opening 82 extending from the first end 74 to the second end 76 and defining an interior portion 84. Extending within the interior portion 84 from the dome 80 is a conically-shaped internal surface 86. Also within the interior portion 84, the nut body 78 includes internal threads 88. The internal threads 88 are adapted to engage threadedly the external threads 26 of the first threaded portion 24 of the body 12. In an embodiment, the compression nut 16 is hexagonal in shape. In other embodiments, the compression nut 16 consists of other shapes and sizes.

Figure 15:
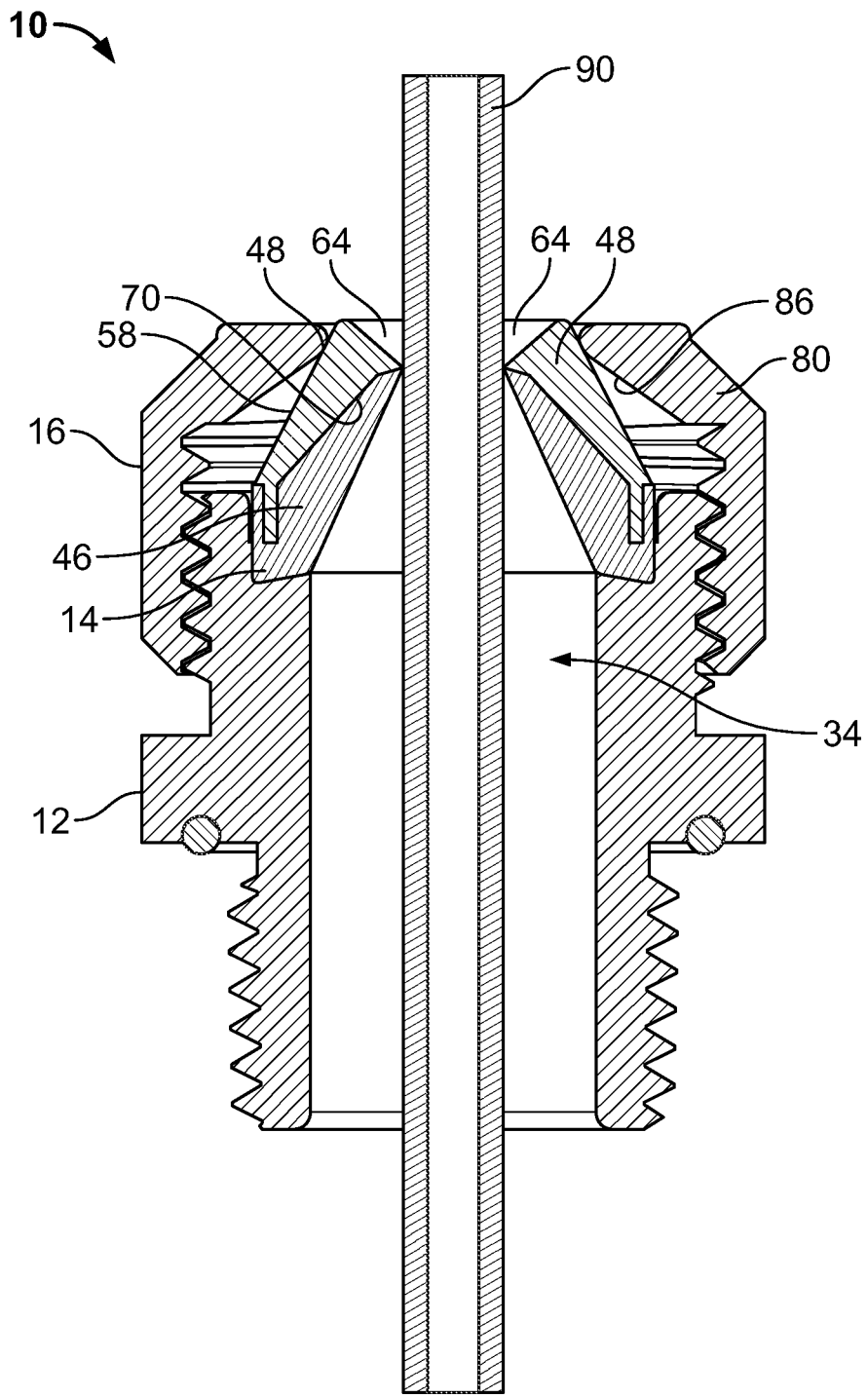
FIG. 15 is a schematic cross-sectional view of the liquid-tight connector shown in FIG. 2, but shown in an installed position and in a liquid-tight engagement with a cable.

In use, the liquid-tight connector 10 is adapted to be affixed in a liquid-tight manner in an aperture of a workpiece (not shown in the Figures), in which a cable 100 (or other suitable elongated member, such as a wire, cable, tube or rod) passes through it and be locked in liquid-tight engagement, as shown in FIG. 15. Alternatively, the cable 100 may first be installed through the connector 10, after which the connector 10 may be engaged in position along the cable 100 and then affixed in an aperture and have the cable 100 engaged tightly.

Referring to FIG. 15, as the compression nut 16 threadedly engages and ratchets on the body 12, the conical internal surface 86 of the dome 80 of the compression nut 16 engages the fingers 48 of the finger/gland assembly 14 in a bearing relationship and biases them towards the center of the central passage 34 of the body 12. As the fingers 48 move towards the center of the central passage, the inner walls 70 of the fingers 48 compress the outer circumferential wall 58 of the sealing gland 46 and the sealing gland 46 collapses inwardly and engages the cable 100 in liquid-tight engagement around its entire circumference. The triangular-shaped surfaces 64 of the fingers 48 further grasp the cable 100, serving as a strain relief holding of the cable 100, and providing an additional seal against liquid penetration. Thus, the engagement of the sealing gland 46 and fingers 48 of the finger/gland assembly 16 against the cable 100 provide a tight, circumferential grasping fit, strain relief, and a liquid-tight seal. Depending upon the outer diameter of the cable 100, the fingers 48 can reduce to a very small diameter and engage a number of diameter sizes. The ratcheting of the compression nut 16 provides for anti-vibration protection and ensures a firm grip on the cable 100. The use of an integral finger/gland assembly or a co-molded finger/gland assembly allows the finger/gland assembly to provide a tight, circumferential grasping fit, strain relief, and liquid-tight seal around smaller-diameter workpieces than are provided by connectors known in the prior art.

Returning to FIG. 2, in an embodiment of the present invention, the O-ring 18 is arranged in the O-ring groove 42 such that the O-ring 18 may form a liquid-tight seal between the second surface 40 of the shoulder 36 and a surface of a workpiece (not shown in the Figures), such as an cabinet or other furnishing, with the second threaded portion 28 of the body 12 inserted through an aperture in the workpiece. In an embodiment, the body 12 is provided without the groove 42, but includes an O-ring 18 arranged such that the O-ring 18 may be compressed between the second surface 40 of the shoulder 36 and the surface of the workpiece to form the liquid-tight seal. In an embodiment, the O-ring groove 42 and the O-ring 18 are not provided, such that the second surface 50 of the shoulder 36 contacts the surface of the workpiece. In an embodiment as discussed hereinbelow, a liquid-tight seal is provided by a sealing element other than an O-ring 18 that is capable of forming a liquid-tight seal between the second surface 40 of the shoulder 36 and a surface of a workpiece. One such sealing element may be a gasket of a type described in more detail hereinbelow.

Figure 16:
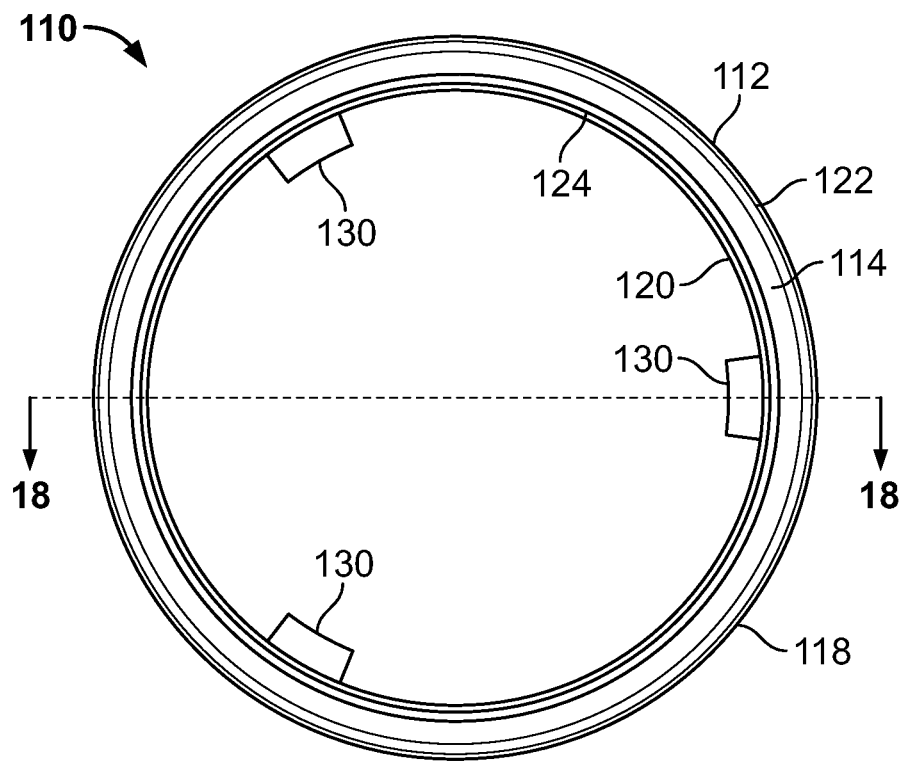
FIG. 16 is a schematic top-down view of a gasket employed in a second liquid-tight connector according to a second embodiment of the present invention.
Figure 17:
FIG. 17 is a schematic elevational view of the gasket shown in FIG. 16.
Figure 18:
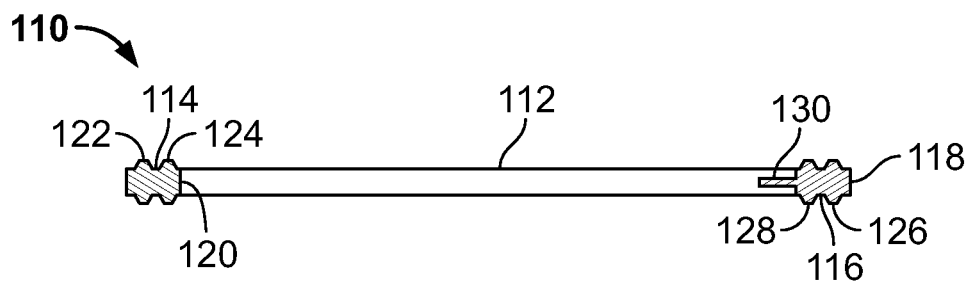
FIG. 18 is a schematic elevational view of the gasket shown in FIG. 16.

FIGS. 16-18 illustrate a sealing element 110 in the exemplary form of a gasket 110 suitable for employment in a second embodiment of a liquid-tight connector according to a second embodiment of the present invention. The gasket 110 may be made of one or more of a soft elastomeric material, a thermoplastic elastomer, a soft metal, or other deformable material. The gasket 110 includes a gasket body 112 having an annular shape, a substantially flat upper surface 114, a substantially flat lower surface 116, an annular outer surface 118 extending from the upper surface 114 to the lower surface 116, and an annular inner surface 120 opposite the outer surface 118 and extending from the upper surface 114 to the lower surface 116. The upper surface 114 has a first outer annular ridge 122 near the outer surface 118 and extending away from the upper surface 114, and a first inner annular ridge 124 near the inner surface 120 and extending away from the upper surface 114. The lower surface 116 has a second outer annular ridge 126 near the outer surface 118 and extending away from the lower surface 116, and a second inner annular ridge 128 near the inner surface 120 and extending away from the lower surface 116. The gasket 110 is provided with a plurality of retaining tabs 130 that are integral with the inner surface 120 and extend away therefrom. The retaining tabs 130 are suitable for engaging with a threaded structure (not shown in FIGS. 16-18) such that the gasket 110 is retained on the threaded structure.

Figure 19:
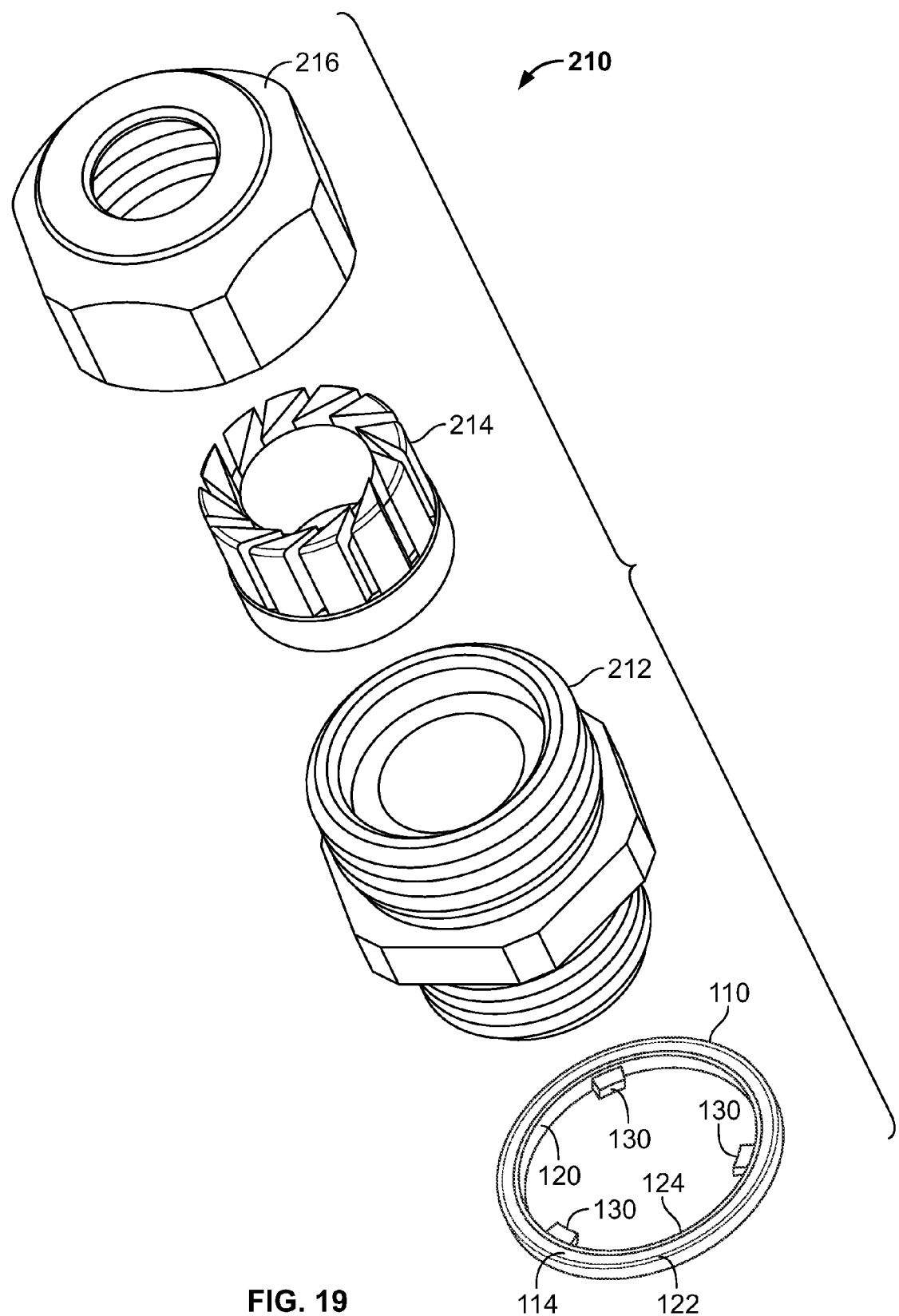
FIG. 19 is a schematic exploded perspective view of the second liquid-tight connector in accordance with a second embodiment of the invention.
Figure 20:
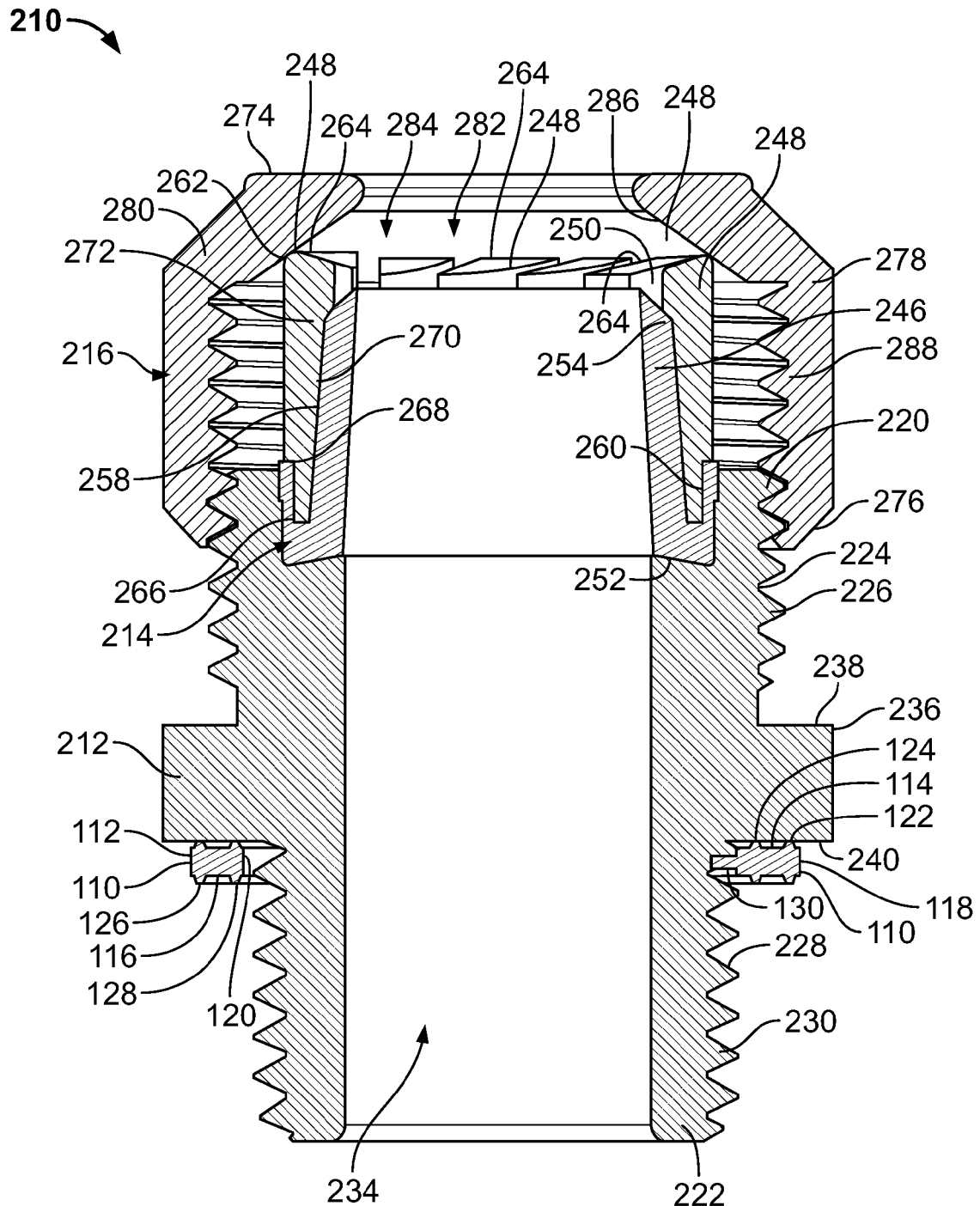
FIG. 20 is a schematic vertical cross-sectional view of the second liquid-tight connector shown in FIG. 18.

Turning to FIGS. 19-20, the fluid-tight connector 210 illustrated therein has numerous components and features that are the same or substantially the same as the components of the fluid-tight connector 10 that are discussed above in relation to FIGS. 1-15. Reference numbers for such components and features have been incremented by 200 when shown in FIGS. 19-20 relative to the reference numbers for the corresponding components and features shown in FIGS. 1-15. Such components and features shown in FIGS. 19-20 should be considered to be the same as described with respect to FIGS. 1-15, unless indicated otherwise hereinbelow. Further, the fluid-tight connector 210 should be considered to operate in the same manner as the fluid tight connector 10, unless indicated otherwise hereinbelow.

Figure 2:
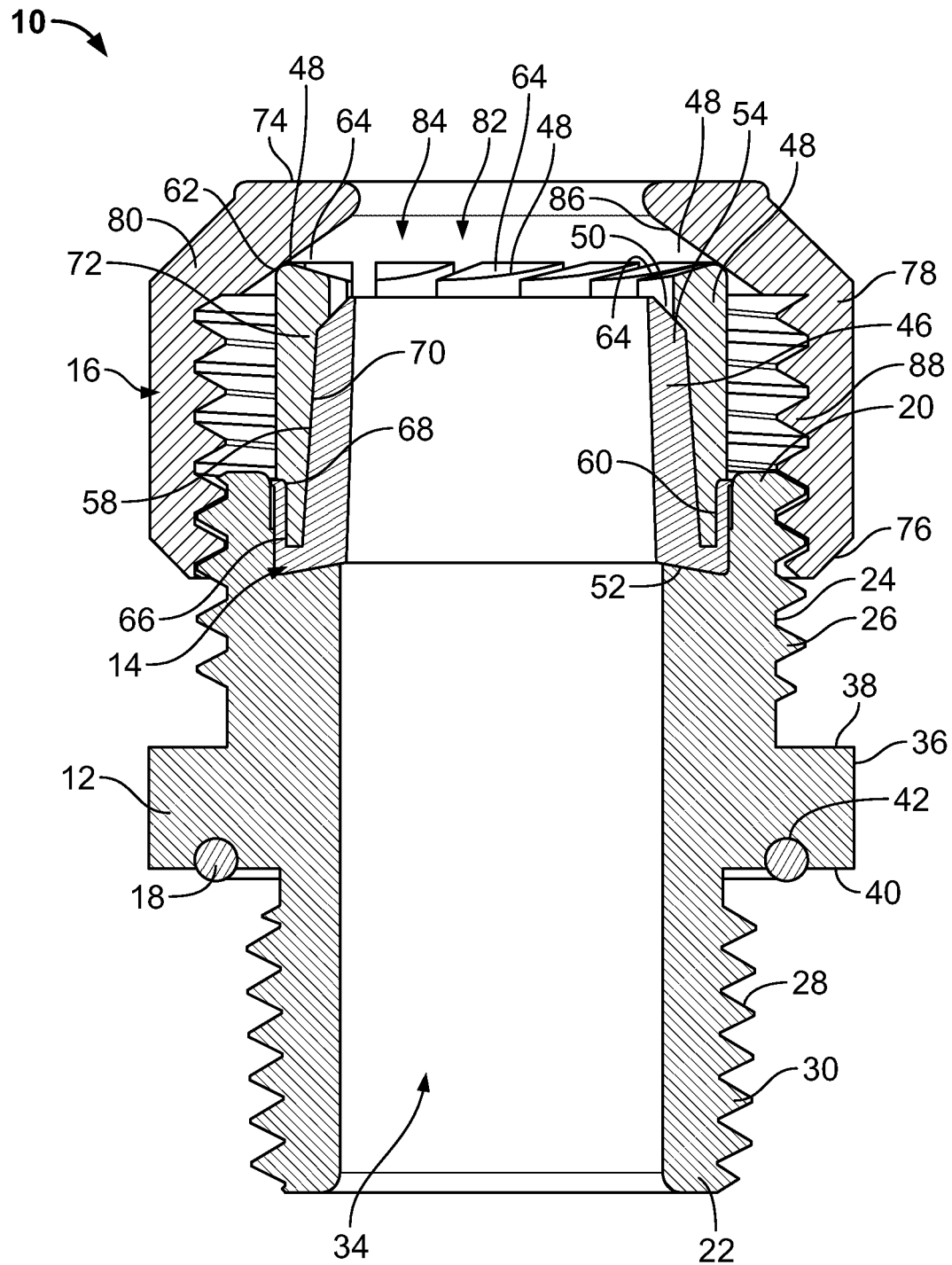
FIG. 2 is a schematic elevational cross-sectional view of the liquid-tight connector shown in FIG. 1.
Figure 3:
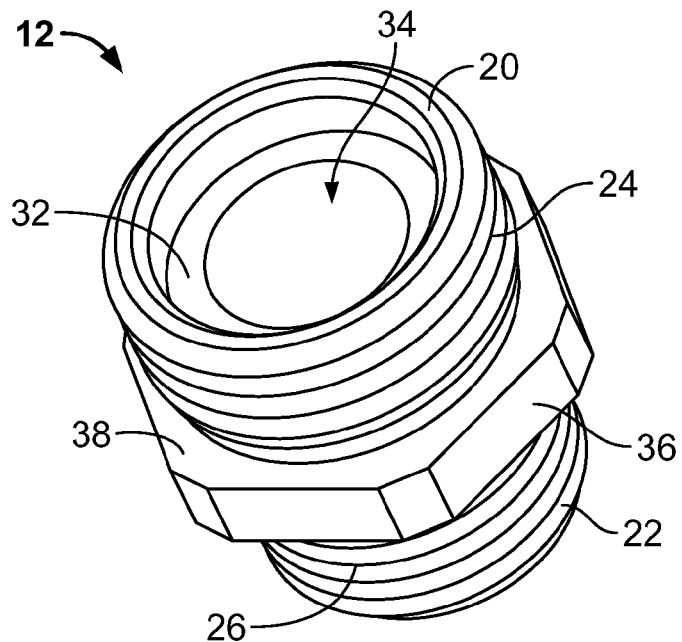
FIG. 3 is a schematic top-down perspective view of a body employed in the liquid-tight connector shown in FIG. 1.
Figure 4:
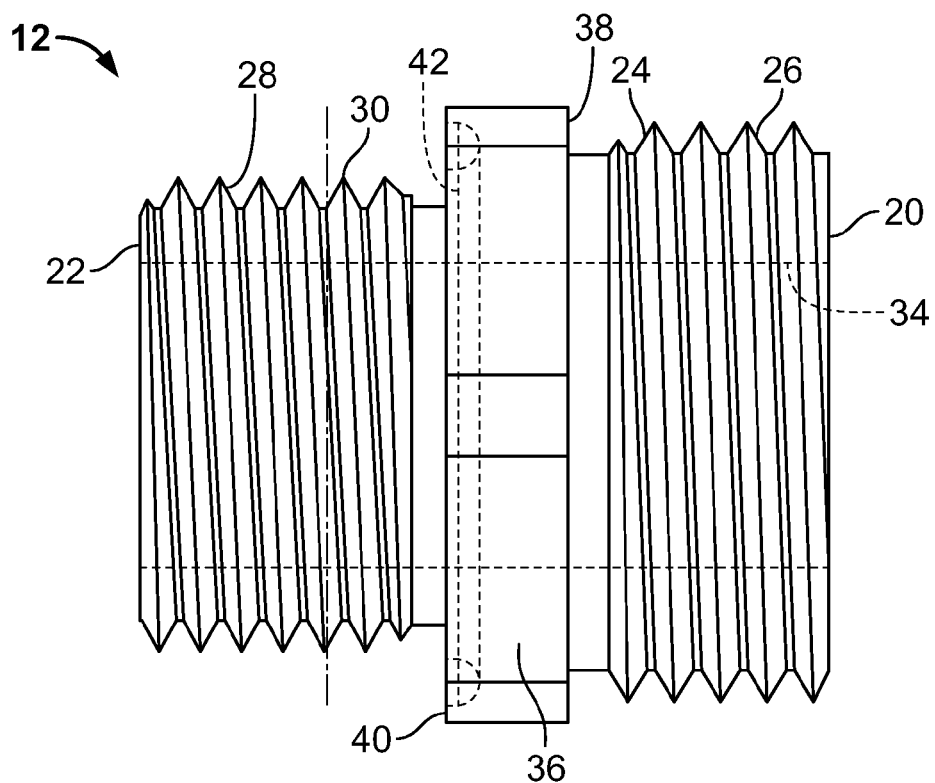
FIG. 4 is a schematic elevational view of the body shown in FIG. 3, with hidden features indicated by dashed lines.
Figure 5:
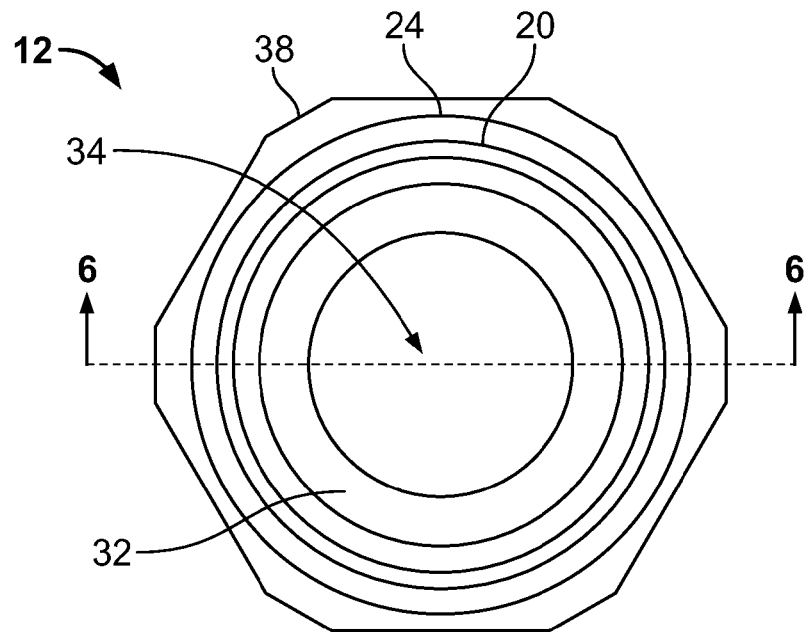
FIG. 5 is a schematic top-down view of the body shown in FIG. 3.
Figure 6:
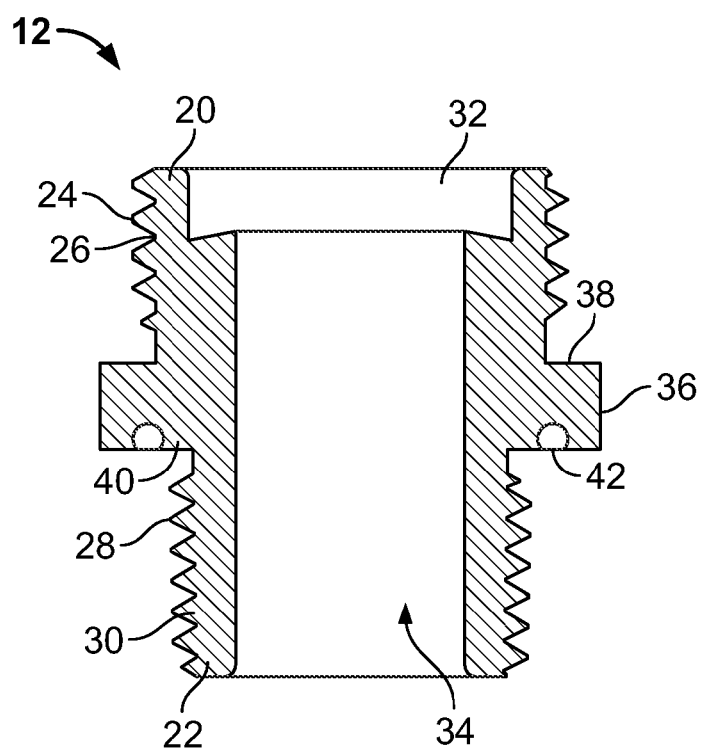
FIG. 6 is a schematic elevational cross-sectional view of the body shown in FIG. 3.
Figure 7:
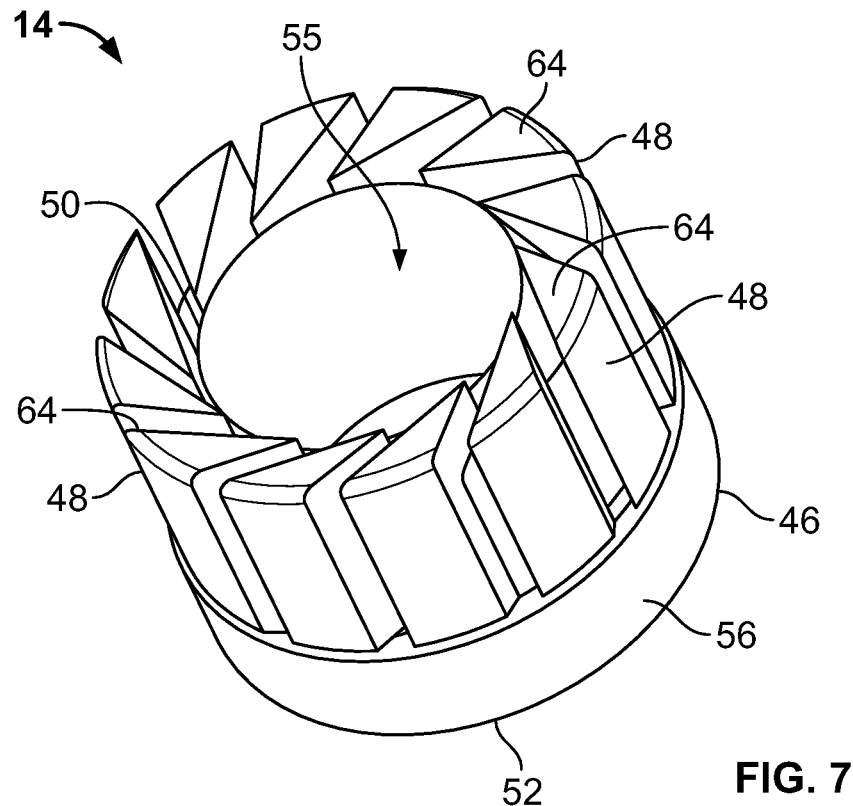
FIG. 7 is a schematic top-down perspective view of a finger/gland assembly employed in the liquid-tight connector shown in FIG. 1.
Figure 8:
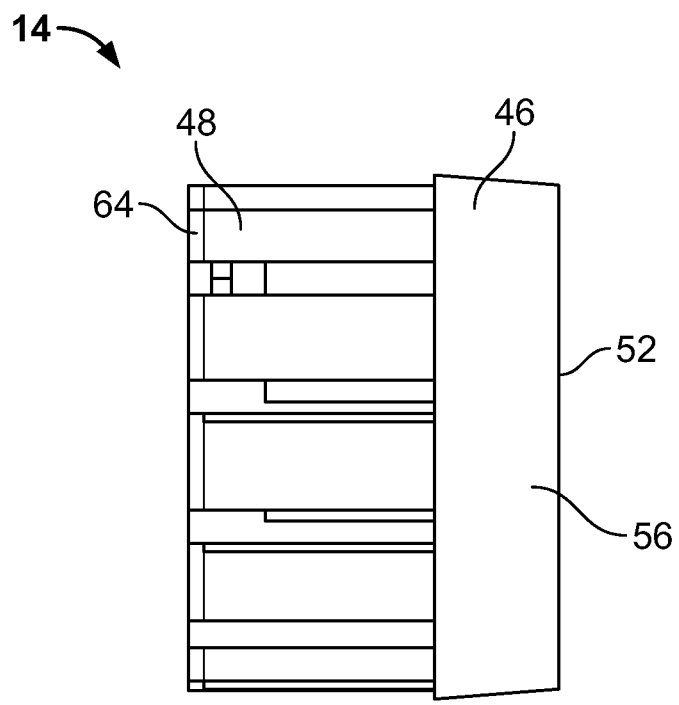
FIG. 8 is a schematic elevational view of the finger/gland assembly shown in FIG. 7.
Figure 9:
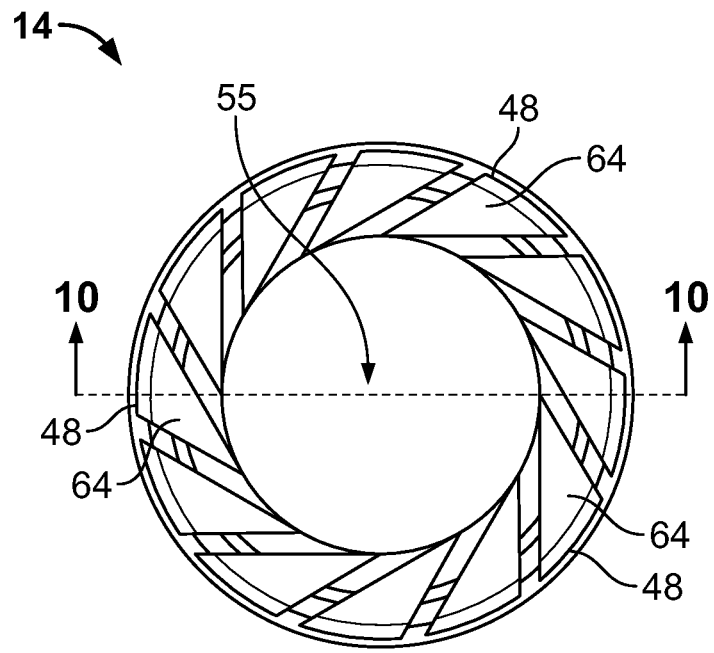
FIG. 9 is a schematic top-down view of the finger/gland assembly shown in FIG. 7.
Figure 10:
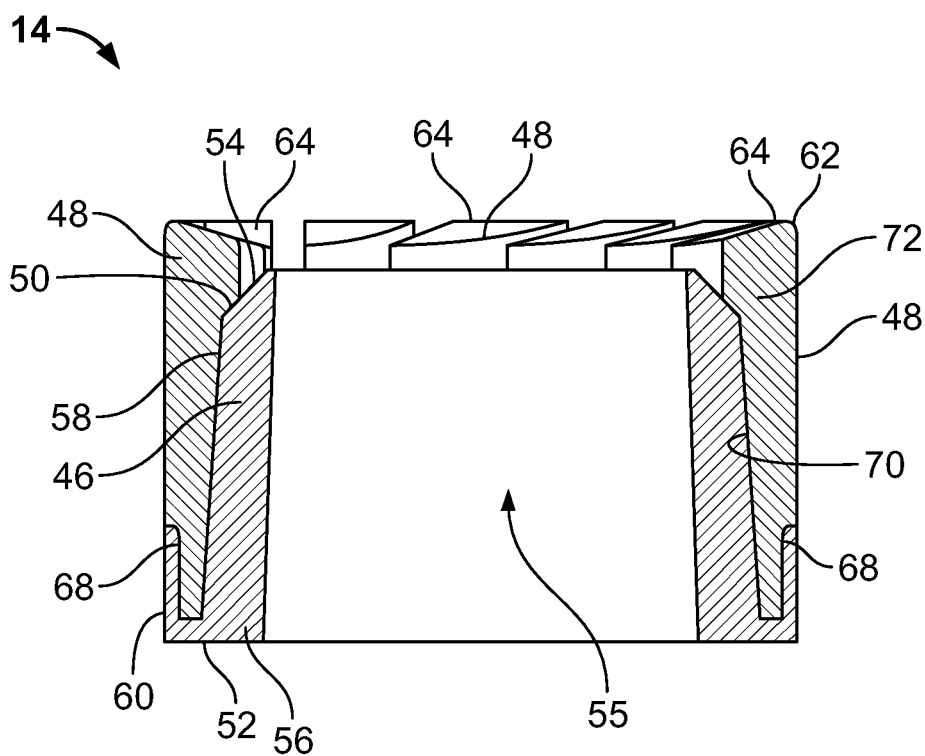
FIG. 10 is a schematic elevational cross-sectional view of the finger/gland assembly shown in FIG. 7.
Figure 12:
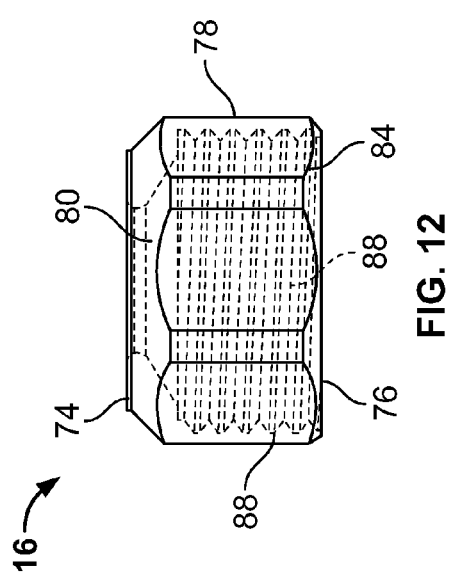
FIG. 12 is a schematic elevational view of the compression nut shown in FIG. 11, with hidden features indicated by dashed lines.
Figure 14:
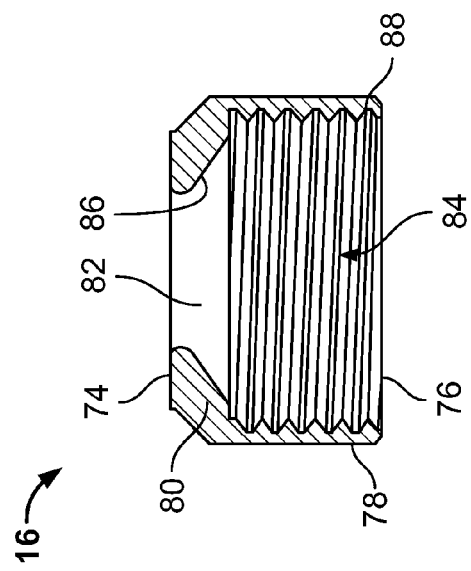
FIG. 14 is a schematic cross-sectional elevational view of the compression nut shown in FIG. 11.
Figure 11:
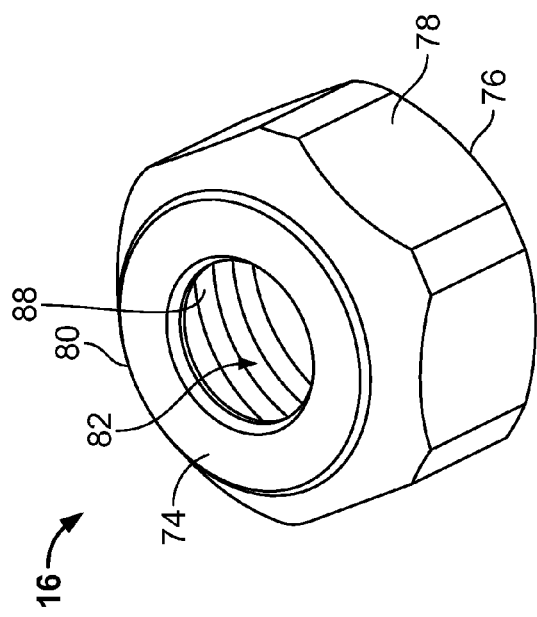
FIG. 11 is a schematic top-down perspective view of a compression nut employed in the liquid-tight connector shown in FIG. 1.
Figure 13:
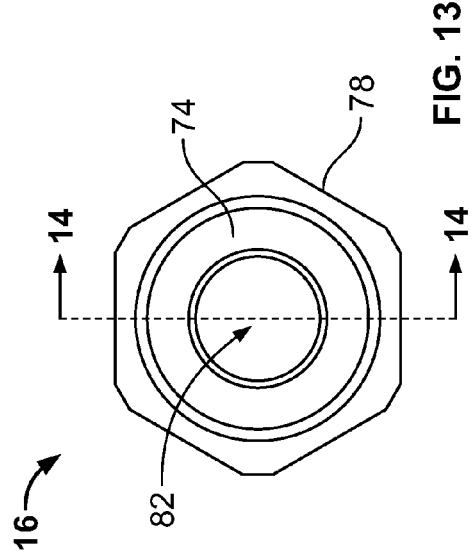
FIG. 13 is a schematic top-down view of the compression nut shown in FIG. 11.

Continuing with FIGS. 19-20, and comparing them with FIGS. 1-2, the second side 40 of the shoulder 36 of connector 10 shown in FIGS. 1-2 is provided with a groove 42 for an O-ring 18. In contrast, and referring to FIGS. 19-20, no groove is provided at the second side 240 of the shoulder 236 of connector 210. Instead of an O-ring 18 (see FIGS. 1-2), the gasket 110 is provided as a sealing element at the second side 240 of the shoulder 236 (see FIGS. 19-20). Referring to FIG. 20, the gasket 110 is placed on the second threaded portion 228 of the body 212 with its first outer annular ridge 122 and first inner annular ridge 124 in contact with the second side 240 of the shoulder 236 and its retaining tabs 130 engaging one or more of the plurality of external threads 230 such that the gasket 110 is retained on the second threaded portion 228. When positioned in the described manner, the gasket 110 may form a liquid-tight seal between the second surface 240 of the shoulder 236 and a surface of a workpiece (not shown in the Figures), such as an cabinet or other furnishing, with the second threaded portion 228 of the body 212 inserted through an aperture in the workpiece. Such an arrangement can also create and maintain a liquid-tight seal between surfaces that are not completely smooth, which might not be readily created or maintained using an O-ring of connector 10.

In some embodiments of the present invention, a gasket may be employed that has more or fewer annular ridges than the gasket 110, but otherwise has the same features as gasket 110. In some embodiments, the gasket may have no annular ridges. In some embodiments, a gasket may be employed that has more or fewer retaining tabs than the gasket 110. In some embodiments, the gasket may have no retaining tabs. In some embodiments, the gasket may be an annular gasket of any type known in the art that is capable of forming a seal between two surfaces when compressed between the two surfaces.

It will be understood that the embodiments of the invention described herein are merely exemplary and that a person skilled in the art may make many variations and modifications without departing from the spirit and scope of the invention. For instance, all such variations and modifications, in addition to those described above, are intended to be included within the scope of the invention, as embodied in the claims appended hereto.

I claim:

1. An assembly for providing a water-tight seal around an elongated object, said assembly comprising:
a sealing gland having a pair of ends opposite each other, an internal opening extending from one of said pair of ends to the other of said pair of ends, a bevel formed at said one end of said sealing gland, a base portion formed at said other end of said sealing gland, an outer circumferential wall extending from said base portion to said one end of said sealing gland, and an annular flange surrounding said outer circumferential wall and extending from said base portion toward said one end of said sealing gland such that said annular flange, said outer circumferential wall and said base portion define a trough, said annular flange having a distal end that is distal from said base portion; and
a plurality of resilient, elongated fingers extending from said trough toward said one end of said sealing gland, each finger having a first end and a second end opposite said first end, each of said second ends being seated in said trough such that each of said second ends of said fingers engage said outer circumferential wall, said annular flange, and said base portion, wherein said second ends of said fingers are restrained by said outer circumferential wall, said annular flange, and said base portion.

2. The assembly of claim 1, wherein said sealing gland and said second ends of said fingers are integral with one another.

3. The assembly of claim 1, wherein said sealing gland and said second ends of said fingers are co-molded with one another.

4. The assembly of claim 1, wherein said sealing gland includes a first material and said fingers include a second material, said first material having a greater elasticity than said second material.

5. The assembly of claim 1, wherein each of said second ends of said fingers has a notched portion seated on said distal end of said annular flange of said sealing gland.

6. The assembly of claim 1, wherein each finger of said plurality of fingers includes an inner wall facing said sealing gland that is engages said outer circumferential wall of said sealing gland.

7. The assembly of claim 6, wherein said first ends of said fingers have upper notched portions formed proximate to said first ends of said fingers and within said inner walls thereof, said first ends of said fingers extending over said one end of said sealing gland such that said upper notched portions of said fingers engage said bevel of said sealing gland and cradle said sealing gland.

8. The assembly of claim 7, wherein said fingers have triangular-shaped surfaces at their first ends.

9. A liquid-tight connector, comprising:
an assembly having a sealing gland and a plurality of resilient elongated fingers, said sealing gland having a pair of ends opposite each other, an internal opening extending from one of said pair of ends to the other of said pair of ends, a bevel formed at said one end of said sealing gland, a base portion formed at said other end of said sealing gland, an outer circumferential wall extending from said base portion to said one end of said sealing gland, and an annular flange surrounding said outer circumferential wall and extending from said base portion toward said one end of said sealing gland such that said annular flange, said outer circumferential wall and said base portion define a trough, said annular flange having a distal end that is distal that is distal said base portion, each of said plurality of fingers having a first end and a second end opposite said first end, said plurality of fingers extending from said trough toward said one end of said sealing gland, each of said second ends being seated in said trough such that each of said second ends of said fingers engage said outer circumferential wall, said annular flange, and said base portion, wherein said second ends of said fingers are restrained by said outer circumferential wall, said annular flange, and said base portion;

a cylindrical body having a first end of said body and a second end of said body opposite said first end of said body, an outwardly-extending external annular shoulder located at a position between said first and second ends of said body and having a first surface facing said first end of said body and a second surface opposite said first surface, a first threaded portion having a first plurality of external threads extending from said first end of said body toward said shoulder, an annular pocket within said first threaded portion and at said first end of said body, and a centrally-located passage of said body extending from said first end of said body to said second end of said body and opening to said annular pocket, said centrally-located passage of said body being adapted to receive the elongated workpiece therein, said annular pocket adapted to receive said collet-type assembly and having said collet-type assembly therein with said internal opening of said sealing gland substantially aligned with said centrally-located passage of said body; and a compression nut including a first end of said compression nut, a second end of said compression nut opposite said first end of said compression nut, a nut body, a dome extending from said nut body to said second end of said compression nut, an opening extending from said first end of said compression nut to said second end of said compression nut and defining an interior portion of said compression nut, said interior portion having a conically-shaped internal surface extending from said dome and widening toward said second end of said compression nut, and a plurality of internal threads extending from said second end toward said conically-shaped internal surface, said plurality of internal threads being arranged to engage threadedly with said first plurality of external threads of said first threaded portion of said body.

10. The liquid-tight connector of claim 9, wherein said sealing gland and said second ends of said fingers are integral with one another.

11. The liquid-tight connector of claim 9, wherein said sealing gland and said second ends of said fingers are co-molded with one another.

12. The liquid-tight connector of claim 9, wherein said sealing gland includes a first material and said fingers include a second material, said first material having a greater elasticity than said second material.

13. The liquid-tight connector of claim 12, wherein each of said second ends of said fingers has a notched portion seated on said annular flange of said sealing gland.

14. The liquid-tight connector of claim 12, wherein each finger of said plurality of fingers includes an inner wall facing said sealing gland that is juxtaposed with and engages said outer circumferential wall of said sealing gland.

15. The liquid-tight connector of claim 14, wherein said first ends of said fingers have upper notched portions formed proximate to said first ends of said fingers and within said inner walls thereof, said first ends of said fingers extending over said one end of said sealing gland such that said upper notched portions of said fingers engage said bevel of said sealing gland and cradle said sealing gland.

16. The liquid-tight connector of claim 15, wherein said fingers have triangular-shaped surfaces at their first ends.

17. A liquid-tight connector, comprising:
an assembly having a sealing gland and a plurality of resilient elongated fingers, said sealing gland having a pair of ends opposite each other, an internal opening extending from one of said pair of ends to the other of said pair of ends, a bevel formed at said one end of said sealing gland, a base portion formed at said other end of said sealing gland, an outer circumferential wall extending from said base portion to said one end of said sealing gland, and an annular flange surrounding said outer circumferential wall and extending from said base portion toward said one end of said sealing gland such that said annular flange, said outer circumferential wall and said base portion define a trough, each of said plurality of fingers having a first end and a second end opposite said first end, said plurality of fingers extending from said trough toward said one end of said sealing gland, each of said second ends being seated in said trough such that each of said second ends of said fingers engage said outer circumferential wall, said annular flange, and said base portion, and are restrained by said outer circumferential wall, said annular flange, and said base portion, said annular flange having a distal surface at an end of said annular flange that is distal from said base;

a cylindrical body having a first end of said body and a second end of said body opposite said first end of said body, an outwardly-extending external annular shoulder located at a position between said first and second ends of said body and having a first surface facing said first end of said body and a second surface opposite said first surface, a first threaded portion having a first plurality of external threads extending from said first end of said body toward said shoulder, an annular pocket within said first threaded portion and at said first end of said body, a centrally-located passage of said body extending from said first end of said body to said second end of said body and opening to said annular pocket, and an annular groove for receiving an annular sealing element, said annular groove located in said second end of said shoulder around said centrally-located passage, said centrally-located passage of said body being adapted to receive the elongated workpiece therein, said annular pocket adapted to receive said collet-type assembly and having said collet-type assembly therein with said internal opening of said sealing gland substantially aligned with said centrally-located passage of said body; and a compression nut including a first end of said compression nut, a second end of said compression nut opposite said first end of said compression nut, a nut body, a dome extending from said nut body to said second end of said compression nut, an opening extending from said first end of said compression nut to said second end of said compression nut and defining an interior portion of said compression nut, said interior portion having a conically-shaped internal surface extending from said dome and widening toward said second end of said compression nut, and a plurality of internal threads extending from said second end toward said conically-shaped internal surface, said plurality of internal threads being arranged to engage threadedly with said first plurality of external threads of said first threaded portion of said body.

18. A liquid-tight connector, comprising:
an assembly having a sealing gland and a plurality of resilient elongated fingers, said sealing gland having a pair of ends opposite each other, an internal opening extending from one of said pair of ends to the other of said pair of ends, a bevel formed at said one end of said sealing gland, a base portion formed at said other end of said sealing gland, an outer circumferential wall extending from said base portion to said one end of said sealing gland and an annular flange surrounding said outer circumferential wall and extending from said base portion toward said one end of said sealing gland such that said annular flange, said outer circumferential wall and said base portion define a trough, each of said plurality of fingers having a first end and a second end opposite said first end, said plurality of fingers extending from said trough toward said one end of said sealing gland, each of said second ends being seated in said trough such that each of said second ends of said fingers engage said outer circumferential wall, said annular flange, and said base portion, and are restrained by said outer circumferential wall, said annular flange, and said base portion, said annular flange having a distal surface at an end of said annular flange that is distal from said base;

a cylindrical body having a first end of said body and a second end of said body opposite said first end of said body, an outwardly-extending external annular shoulder located at a position between said first and second ends of said body and having a first surface facing said first end of said body and a second surface opposite said first surface, a first threaded portion having a first plurality of external threads extending from said first end of said body toward said shoulder, a second threaded portion having a second plurality of external threads extending from said second end of said body toward said shoulder, an annular pocket within said first threaded portion and at said first end of said body, a centrally-located passage of said body extending from said first end of said body to said second end of said body and opening to said annular pocket, and an annular sealing element around said centrally-located passage and engaged with said second plurality of external threads, said centrally-located passage of said body being adapted to receive the elongated workpiece therein, said annular pocket adapted to receive said collet-type assembly and having said collet-type assembly therein with said internal opening of said sealing gland substantially aligned with said centrally-located passage of said body; and a compression nut including a first end of said compression nut, a second end of said compression nut opposite said first end of said compression nut, a nut body, a dome extending from said nut body to said second end of said compression nut, an opening extending from said first end of said compression nut to said second end of said compression nut and defining an interior portion of said compression nut, said interior portion having a conically-shaped internal surface extending from said dome and widening toward said second end of said compression nut, and a plurality of internal threads extending from said second end toward said conically-shaped internal surface, said plurality of internal threads being arranged to engage threadedly with said first plurality of external threads of said first threaded portion of said body.

19. The assembly of claim 1, wherein each of said fingers has a flexing point proximal to said second end of said finger and said distal end of said annular flange.

20. The assembly of claim 5, wherein each of said fingers has a flexing point proximal to said notched portion of said finger.

* * * * *